US008225363B1

(12) United States Patent
Joshi et al.

(10) Patent No.: US 8,225,363 B1
(45) Date of Patent: Jul. 17, 2012

(54) WIRELESS INFORMATION TRANSFER AND INTERACTIVE TELEVISION SYSTEM

(75) Inventors: Rajiv V. Joshi, Yorktown Heights, NY (US); Suchitra R. Joshi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1790 days.

(21) Appl. No.: 09/133,960

(22) Filed: Aug. 14, 1998

(51) Int. Cl.
*H04N 7/173* (2006.01)
(52) U.S. Cl. .......................... 725/109; 725/78; 725/110
(58) Field of Classification Search .......... 725/121–123, 725/64, 65, 109, 68, 33, 32, 110, 112, 131, 725/151, 78, 107; 348/551–554; 709/219–220, 709/245; 345/721; 370/319, 353
See application file for complete search history.

(56) References Cited

U.S. PATENT DOCUMENTS

| | | | | |
|---|---|---|---|---|
| 5,053,782 A | * | 10/1991 | Levinberg et al. ............ | 342/352 |
| 5,321,514 A | | 6/1994 | Martinez | |
| 5,347,304 A | | 9/1994 | Moura et al. | |
| 5,404,393 A | | 4/1995 | Remillard | |
| 5,481,542 A | * | 1/1996 | Logston et al. ............... | 725/131 |
| 5,488,412 A | | 1/1996 | Majeti et al. | |
| 5,534,913 A | | 7/1996 | Majeti et al. | |
| 5,561,703 A | * | 10/1996 | Arledge et al. .............. | 340/7.29 |
| 5,608,446 A | | 3/1997 | Carr et al. | |
| 5,613,191 A | | 3/1997 | Hylton et al. | |
| 5,654,748 A | * | 8/1997 | Matthews, III ................. | 725/14 |
| 5,812,931 A | * | 9/1998 | Yuen ............................. | 725/123 |
| 5,825,407 A | * | 10/1998 | Cowe et al. .................... | 725/143 |
| 5,903,262 A | * | 5/1999 | Ichihashi et al. .............. | 725/136 |
| 5,963,862 A | * | 10/1999 | Adiwoso et al. .............. | 455/430 |
| 5,991,596 A | * | 11/1999 | Cunningham et al. ........ | 455/12.1 |
| 5,991,800 A | * | 11/1999 | Burke et al. ................... | 725/110 |
| 5,999,970 A | * | 12/1999 | Krisbergh et al. ............. | 725/109 |
| 6,020,845 A | * | 2/2000 | Weinberg et al. .............. | 455/12.1 |
| 6,026,086 A | * | 2/2000 | Lancelot et al. .............. | 370/353 |
| 6,049,539 A | * | 4/2000 | Lee et al. ....................... | 370/355 |

(Continued)

FOREIGN PATENT DOCUMENTS

WO     WO 9636928 A1     11/1996

(Continued)

*Primary Examiner* — Son P Huynh
(74) *Attorney, Agent, or Firm* — F. Chau & Associates, LLC; Anne V. Dougherty, Esq.

(57) ABSTRACT

A wireless information signal transfer and interactive television system comprises: a first communication unit, operatively coupled to a television set, for generating an information signals and for generating display signals for display on the television set; a remote keyboard device, wirelessly coupled to the first communication unit, for permitting a system user to control display of the display signals on the television set and enter data corresponding to the display of the display signals; a satellite network, operatively coupled to the first communication unit, for wirelessly transferring signals including the information signals; a second communication unit, operatively coupled to the satellite network, for receiving the information signals; and a server, operatively coupled to the second communication unit, for processing the information signals and providing data included in the information signals to a network; wherein the server retrieves return data from the network and provides the return data to the second communication unit, the second communication unit generating return information signals and providing the return information signals to the satellite network, the satellite network wirelessly transferring the return information signals to the first communication unit, which generates the display signals for display on the television set.

42 Claims, 5 Drawing Sheets

U.S. PATENT DOCUMENTS

| | | | | |
|---|---|---|---|---|
| 6,058,430 | A | * | 5/2000 | Kaplan .......................... 709/245 |
| 6,075,527 | A | * | 6/2000 | Ichihashi et al. .............. 345/721 |
| 6,084,876 | A | * | 7/2000 | Kwok et al. .................. 725/131 |
| 6,141,356 | A | * | 10/2000 | Gorman ......................... 370/493 |
| 6,163,316 | A | * | 12/2000 | Killian .......................... 345/721 |
| 6,240,073 | B1 | * | 5/2001 | Reichman et al. ............ 370/319 |
| 6,260,192 | B1 | * | 7/2001 | Rosin et al. .................... 725/39 |
| 6,263,501 | B1 | * | 7/2001 | Schein et al. ................... 725/39 |
| 6,285,407 | B1 | * | 9/2001 | Yasuki et al. .................. 348/554 |
| 6,295,057 | B1 | * | 9/2001 | Rosin et al. ................... 345/744 |
| 6,320,941 | B1 | * | 11/2001 | Tyroler ........................ 37/93.24 |

FOREIGN PATENT DOCUMENTS

| | | |
|---|---|---|
| WO | 97/12486 | 4/1997 |
| WO | WO 9935771 A1 | 7/1999 |

* cited by examiner

WIRELESS INFORMATION TRANSFER AND INTERACTIVE TELEVISION SYSTEM

BACKGROUND OF THE INVENTION

The present invention generally relates to wireless information transfer and interactive manipulation of such information using an electronic medium and, more particularly, relates to sending and receiving information, e.g., messages, text, and graphics, via a wireless medium and generating and/or viewing such information through a television.

It is known that a conventional television can receive information signals through a modem connected to a telephone line or audio/video signals through a cable line. However, transmission of audio/video signals is done in one direction and sending from the television is not possible or, at least, known to be a problem. Also, sending of signals long distance across a cable wire poses several problems due to, for example, signal loss.

Recently, the literature, particularly U.S. Pat. No. 5,404,393 to Remillard, discloses an electronic device and method for accessing facilities and displaying associated information on conventional television sets. Information related to available facilities and programming are downloaded to electronic devices. However, all communications are through telephone lines or through cable. The signals which are transmitted across telephone lines have a bandwidth of around 3-5 MHz. For cable transmission, especially for sending the signals from the users or viewer for pay-per view requests, frequencies are limited to about 5 to 6 MHz per channel.

It would be highly advantageous to provide methods and apparatus for providing wireless transfer of information and interactive capability through a conventional television for generating, editing and/or viewing such information, for example, information related to financial markets, banking applications or information related to emergency situations (e.g., distress calls). For instance, being able to receive, as well as send, messages related to purchasing stocks would save time. Also, in an emergency situation, the ability to generate or receive a distress message via a persons' television set would save time and, as a result, likely save lives. The wireless transmission would advantageously provide global long distance access of information. For clarity of information, it would also be desirable that the wireless medium be capable of transmitting digital signals.

SUMMARY OF THE INVENTION

The present invention provides methods and apparatus for transmitting signals to and from an electronic medium, such as television, by a wireless medium. The invention preferably utilizes wireless communication through satellites which provide higher uplink (sending signals to a satellite) and downlink (receiving signals from a satellite) frequencies as compared to low frequency conventional telephone or cable communications. Satellites act as a medium for transferring signals from a television to other devices, such as a network server or wireless pager. The invention provides a user with access to information without the disadvantages associated with cable or telephone wires. Interactive access to television and other electronic media is preferably possible using a remote keyboard employing infrared data transmission technology.

In one aspect of the invention, a wireless information signal transfer and interactive television system comprises: at least a first communication unit, operatively coupled to a television set, for generating at least one information signal and for generating at least one display signal for display on the television set; a wireless signal transfer network, operatively coupled to the at least a first communication unit, for wirelessly transferring signals including the at least one information signal; at least a second communication unit, operatively coupled to the wireless transfer network, for receiving the at least one information signal; and a server, operatively coupled to the at least a second communication unit, for processing the at least one information signal and providing data included in the information signal to a network.

According to another aspect of the present invention, a wireless information transfer and interactive television system includes a television set and a communication unit (i.e., set-top box unit) connected to a wireless communication system, such as a satellite network, which transmits signals from one satellite transceiver to another remotely located satellite transceiver via one or more satellites. The remotely located satellite transceiver is connected to a similar communication unit which, itself, is connected to a server. The server is connected to a LAN (local area network) or WAN (wide area network).

Information contained in the signals received from the server is displayed on the television set of the recipient. Generation of information, editing of received information, and control of the information displayed is preferably performed by means of a wireless keyboard. The keyboard characters are conventional alphanumeric characters as found on any standard computer keyboard. For example, messages typed via the keyboard are translated by a CPU chip mounted inside the communication unit and displayed on the television and then sent, for example, as e-mail through the satellite network. A graphical user interface, such as a menu display, is used for displaying information received by the television and generated by the user via the wireless keyboard. When information is generated at the users end, signals are transmitted to one satellite transceiver which transfers them to another satellite transceiver via one or more satellites. The remotely located satellite transceiver then delivers the information to another communication unit connected to a network server. The server may then return information to the user using the reverse wireless signal path. Preferably, once the signals are received, an LED indicator on the recipients' communication unit indicates the receipt of signals. Then, using the keyboard, the user preferably invokes the menu through which the information is displayed on the television screen.

In another embodiment of the present invention, the server communicates with one or more wireless pagers via a paging network. The pager(s) preferably sends alphanumeric messages to the server which then sends the messages to its associated communication unit. The communication unit sends the messages on to the satellite network to be received by the intended recipient via his communication unit and television set. Messages are also sent from a television set with a communication unit to an intended pager via the reverse path.

In yet another embodiment, the server may be connected to an emergency response network (e.g., 911 operator) whereby the user may generate a distress message through his or her television set, in accordance with the invention, to be sent to the emergency response network. Operators associated with the emergency response network could then dispatch appropriate emergency personnel (police, fire, medical) to the users' location to assist him or her.

It is to be appreciated that the present invention has many applications. For instance, the present invention is useful for financial analysis and conveying and receiving spur of the moment decisions. When the user decides to access information on stock markets or banking information, he selects one of the menu items by operating the remote keyboard. He then selects a particular item or types messages which are then stored in memory for further handling by a CPU (central processing unit). The request message is then sent to the satellite transceiver which then accesses the appropriate server through another satellite transceiver and gets the desired service or information.

It is to be further appreciated that the present invention contemplates a plurality of user stations (i.e., communication unit and television set) and a plurality of remote information sources (i.e., communication unit and network server). Also, one of ordinary skill in the art will contemplate various applications for implementing the teachings of the present invention described herein. Accordingly, any applications discussed herein are merely exemplary in nature and not intended to limit the scope of the invention.

As will be described in detail below, the present invention provides easy access across long distances to remote locations without the use of telephone lines or cables. Therein lies one of the advantages of the present invention, that is, being able to send and receive messages over long distances within the country, as well as globally.

As described above, an important need exists for clear, long distance transmission to and from a user in cooperation with interactive television services. The present invention preferably satisfies this and other needs by the use of satellite transmission with an uplink satellite frequency range of around 6-12 Ghz. In addition, the invention preferably takes full advantage of on-chip integrated circuit technology where CPU and memories and information processing circuitry are mounted on integrated circuitry inside the set-top box. Standard television medium is used to display text, messages and graphics, etc.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
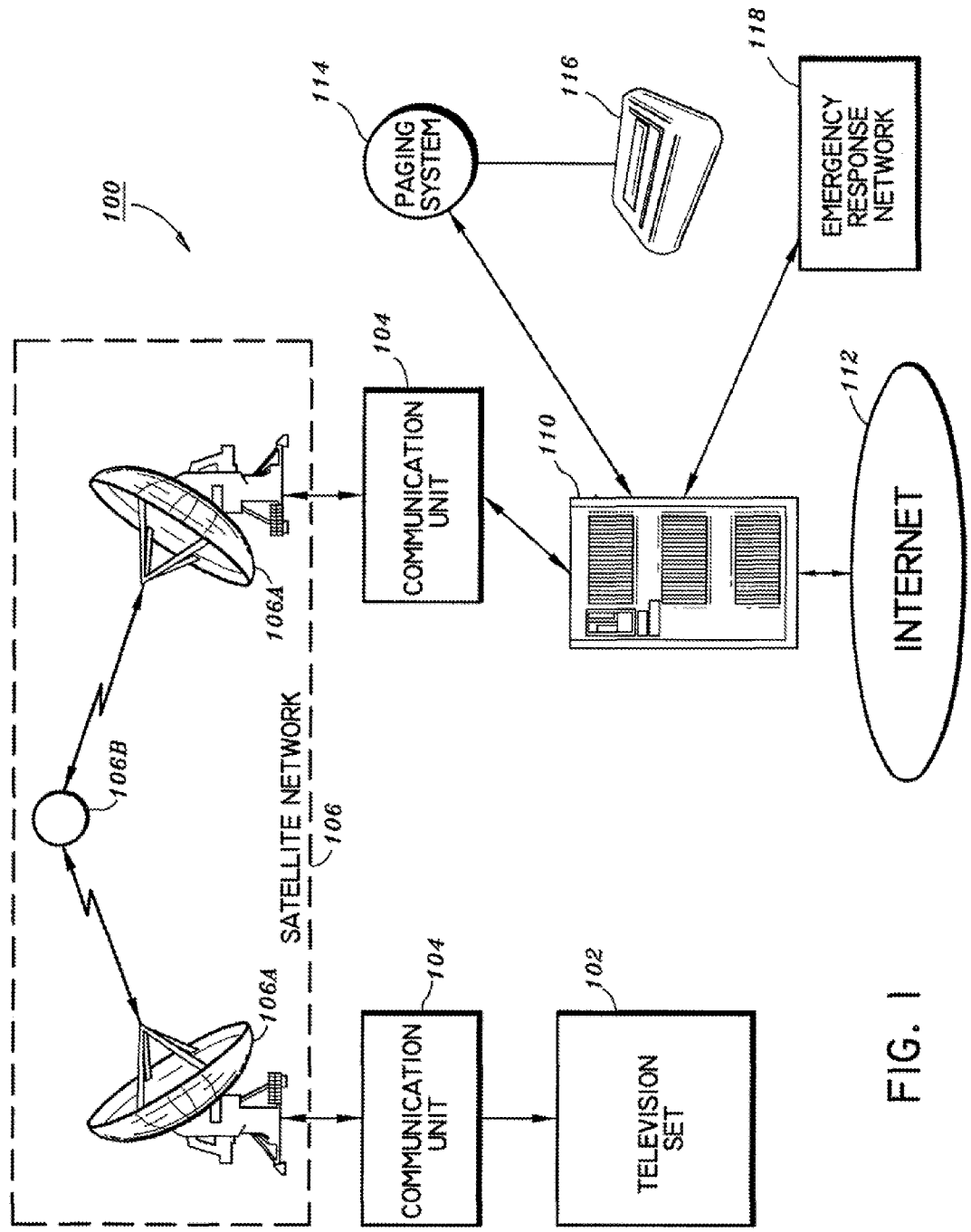
FIG. 1 is a block diagram of a wireless information transfer and interactive television system according to the present invention.

Referring now to FIG. 1, a block diagram of a wireless information transfer and interactive television system 100 according to the present invention is shown. In the embodiment illustrated in FIG. 1, the system 100 includes a television set 102. It is to be appreciated that the television set 102 is a conventional television set capable of receiving display signal(s) (including text, graphics, etc.) formed according to the invention. It is to be further appreciated that the television set may have an additional port for receiving the display signal; however, display of the signal is accomplished in a conventional manner, that is, in a known manner in which other display signals may be processed and displayed by the television set. Alternatively, the display signal formed according to the present invention may be combined (e.g., superimposed) with a conventional television signal that the television set receives at its television signal port. In any case, processing and display of the display signal of the invention on the television screen is accomplished in a conventional manner and, as such, is not further discussed herein.

The television set 102 is operatively coupled to a communication unit 104. As will be explained in the context of FIG. 2, the communication unit 104, preferably in the form of a set-top box unit, provides information and display signal generating, editing and displaying functions in cooperation with a remote keyboard device (214 in FIG. 2). The communication unit 104 is operatively coupled to a satellite network 106. The satellite network 106 includes a plurality of satellite transceivers, e.g., transceivers 106A, in communication with each other via one or more satellites 106B. The satellite transceiver 106A will be explained later in the context of FIG. 3. The satellite network itself may be a satellite communication network used for various commercial applications or a dedicated satellite network. However, it should be understood that while the embodiment of the invention illustrated in the context of FIG. 1 includes satellite communication, other forms of wireless communication may be employed by the invention.

Nonetheless, the communication unit 104 coupled to the users' television set 102 is operatively coupled to the satellite transceiver 106A. The satellite transceiver 106A is in communication with the remote satellite transceiver 106A via the satellite 106B. Another communication unit 104 (remote communication unit), identical to the communication unit coupled to the television set 102, is operatively coupled to the remote satellite transceiver 106A and provides similar functions as the other communication unit. The remote communication unit 104 is also operatively coupled to a network server 110. It is to be understood that the network server is a digital computer capable of coordinating data requests and messages generated in accordance with the invention. The server 110 is shown as being operatively coupled to a wide area network 112 such as the Internet; however, the server 110 may alternatively be coupled to a local area network.

It is to be understood that the specific functions of the server 110 depend on the applications with which the system 100 of the invention are employed. For instance, if a user of the system 100 is interested in retrieving financial data, the server 110 would receive such a request as generated at the user station and then search the network to which it is connected for the requested information. In the case that the server 110 is connected to the Internet, the user may, for example, direct a particular request to a financial web site by selecting the appropriate web address from a menu on his television screen. The server 110 uses the address and the request and retrieves the information on the Internet. The server 110 then provides the information to the remote communication unit 104 for transmission through the satellite network 106 back to the user station. Also, e-mail messages may be generated on the television set and transferred to a mail server on the Internet. Also, return e-mail may be received in a similar manner. It is to be appreciated that the internal architecture of the server 110 is not critical to the invention and, as such, the server 110 may be configured as an appropriately programmed general purpose digital computer capable of operating as a server with a central processing unit (CPU) coupled to RAM, ROM, a mass storage memory device, and input/output devices via a computer bus. In addition, in a further embodiment, the server 110 is preferably coupled to a paging system 114 which is in communication with a plurality of wireless pagers, such as pager 116. Still further, in yet another embodiment, the server 110 is preferably coupled to an emergency response network 118 (e.g., 911 operator) which, as mentioned, provides the user with the ability to send a distress message to emergency personnel (e.g., police, fire, medical) in order to provide needed assistance to the user. It is to be appreciated that the server 110 is preferably connected to each of the various application-specific service networks via conventional modems over telephone lines. As is known, the Internet 112 is comprised of various functional servers with modems with which the server 110 can communicate with using its own internal modem. For example, in the case of e-mail, the server 110 communicates with a mail server on the Internet. Likewise, in the paging system (114) embodiment and the emergency response network (118) embodiment, each system also has a server with a modem for communicating with the server 110.

Preferably, the communication unit 104 at the user station is in the form of a set-top box and is mounted on top of or next to the television set 102. As will be explained, the user generates signals which may include, for example, messages, e-mail, graphics, video and audio at the user station. The signals are provided to the satellite transceiver 106A which transmits them across the satellite network, via the satellite 106B, to the remote satellite transceiver 106A which is tuned to the satellite 106B. Another communication unit 104 connected to the remote satellite transceiver 106A transmits the signals to the server 110 which in turn delivers them to the Internet 112, the pager 116, or the emergency response network 118.

The process of transmitting information back to the user station from the Internet 112 or the pager 116 is as follows. The server 110 receives such information from the network 112 or the pager 116 and provides the information to the communication unit 104 connected thereto. Return information from the emergency response network 118 is also handled in the same manner. The communication unit 104 generates the signal to be transmitted to the user and provides the signal to the satellite transceiver 106A which transmits the information signal through the satellite network 106 to the user station transceiver 106A. The signal received by the user station transceiver 106A is provided to the communication unit 104 connected thereto which then processes the signal and provides the information to the television set 102 for display thereon to the user. As will be explained, other signals may be transmitted by the transceiver 106A or received for display by the television set 102.

Figure 2:
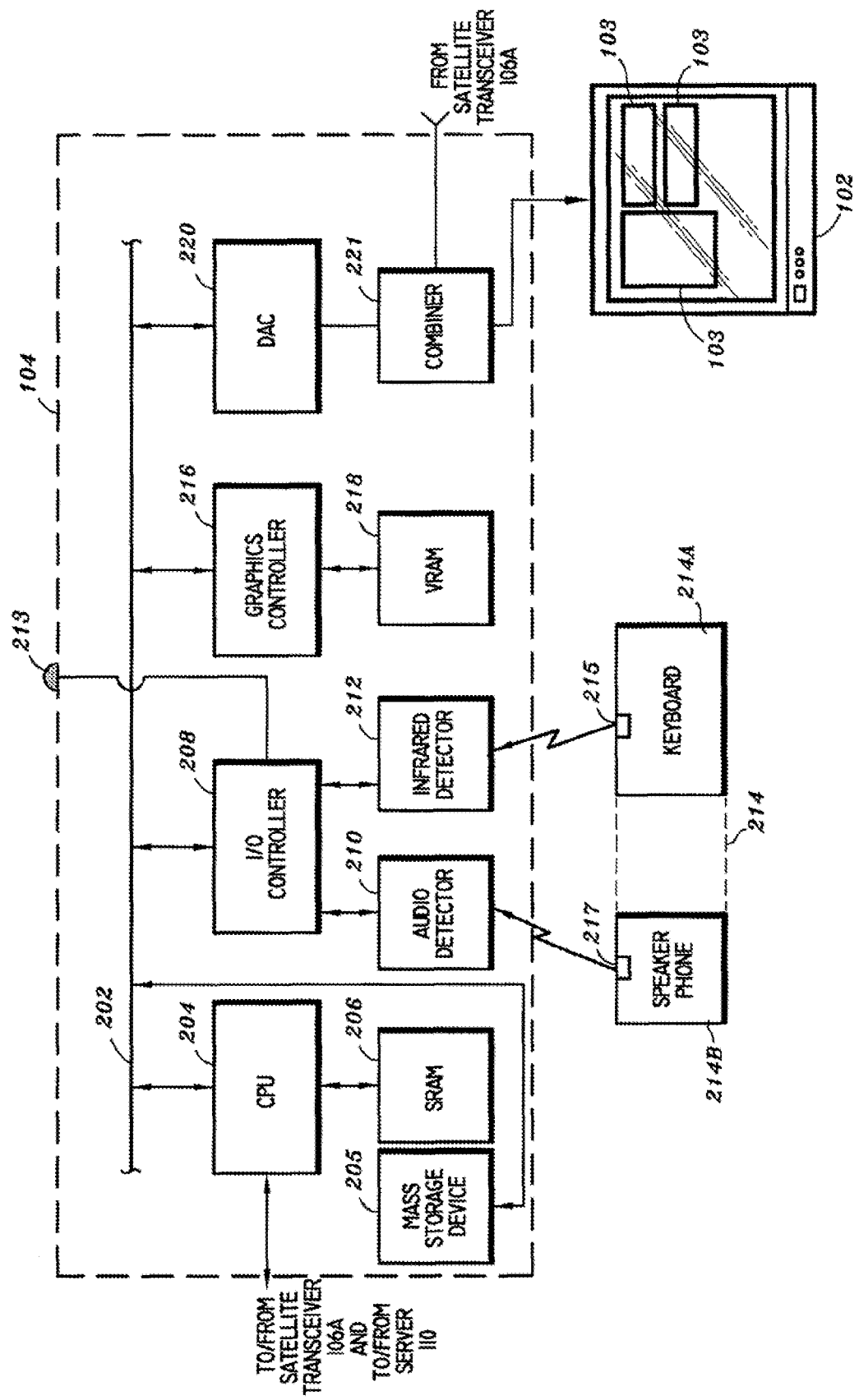
FIG. 2 is a block diagram of a communication unit according to one embodiment of the present invention.

Referring now to FIG. 2, an embodiment of a communication unit 104 for providing the interactive television functions of the invention is shown. The communication unit 104 includes a computer bus 202 for operatively coupling a central processing unit (CPU) 204 with a mass storage device 205, an input/output (I/O) controller 208, a graphics controller 216, and a digital-to-analog converter (DAC) 220. The CPU 204 has its own RAM coupled thereto, i.e., SRAM 206. The mass storage device serves as a larger memory storage facility for the processes performed by the CPU 204. An audio detector 210, an infrared detector 212, and an LED indicator 213 are operatively coupled to the I/O controller 208. A remote keyboard unit 214 is in wireless communication with the audio and infrared detectors 210 and 212. The graphics controller 216 is operatively coupled to its own RAM, i.e., VRAM 218. The DAC 220 is preferably operatively coupled to a signal combiner 201 which is operatively coupled to the transceiver 106A and to the television set 102.

The CPU 204 controls the overall operations of the communication unit 104. The CPU communicates with the I/O controller 208, the graphics controller 216 and the DAC 220 over the computer bus 202. Operation of the communication unit 104 will now follow.

The remote keyboard 214 is used to invoke menu-driven windows 103 on the screen of the television set 102 for the user to be able to generate and edit messages and view information received from the server 110. The menu-driven windows 103 are generated from the display signals provided from the communication unit 104 to the television set 102. As mentioned, similar to any display signal presented independently to the television or combined (e.g., superimposed) on a standard television signal (via signal combiner 221), the display signals (which may include, for example, text and graphics) of the invention are processed and displayed by the television in a conventional manner. Also, the actual layout and content of the menu-driven windows are specific to the application with which the user is using the system, e.g., e-mail, paging, financial market tracking or analysis, emergency message generation, etc. Examples of menu-driven windows will be explained in the context of FIGS. 4A through 4D.

The remote keyboard 214 preferably includes a keyboard portion 214A and a speaker phone portion 214B. The keyboard portion 214A is similar to a conventional keyboard, that is, it preferably includes standard alphanumeric characters and function keys, e.g., similar to a standard QWERTY keyboard. Menus are activated using the keyboard and the messages are typed in. For receipt of audio uttered by a user, there is a speaker phone portion 214B provided. As mentioned, a conventional trackball may also be included as part of the keyboard portion 214A. In such case, the movement of the trackball by the user corresponds to the movement of an on-screen cursor. The user can then click on icons in the menus in order to control functions and make selections. Messages, control information, and audio are detected by the infrared detector and audio detector, respectively. The keyboard portion 214A includes an infrared transmitter 215 for transmitting the keystrokes or movements performed by the user on the keyboard to the infrared detector 212. The infrared detector 212 then provides the information to the I/O controller 208 which then converts the information to digital form and sends the information to the CPU 204 via bus 202. Any data manipulation and instruction fetches are controlled by the CPU 204 in cooperation with an associated cache memory (SRAM 206). The instructions are passed to the graphic controller 216 via bus 202 which essentially controls the generation of the display signals and display of the menu-driven windows 103 on the television set 102. The VRAM 218 serves as a main memory of the graphic controller 216 and is used to store the pixels of the menu-driven windows 103, as well as colors, if needed. The output of the graphic controller 216 is then converted from a digital signal to an analog signal which is then subsequently displayed on the television set 102.

As mentioned, the present invention also preferably includes audio capability. The user utters messages, rather than typing them, and the uttered messages are picked up by the speaker phone portion 214B of the remote keyboard unit and transmitted to the audio detector 210 via an RF transmitter 217. The audio detector 210 provides the audio to the I/O controller 208 which converts the signal into digital form and sends it to the CPU 204 via bus 202. The CPU 204 then sends the audio data to the graphics controller 216 which generates text from the data and displays the text message in the appropriate places in the menu-driven windows 103 displayed on the television set 102.

When a signal is received from the satellite transceiver 106A, as will be explained, the CPU 204 instructs the I/O controller 208 to illuminate the LED indicator 213 to inform the user that requested and/or new information has been received.

Furthermore, the CPU 204 of the remote communication unit 104 is operatively coupled to the server 110 (i.e., the CPU of the server 110). In this way, the CPU 204 transmits the users request or message, received on the satellite network, to the server so that the server 110 may process the request or message and access the network 112, the pager system 114, or the emergency response network 118. Likewise, the requested information or a return message is provided to the CPU of the server 110, which then passes it on to the CPU 204 of the remote communication unit 104. The CPU 204 then passes the information to the transceiver 106A for transmission back to the user station.

It is to be appreciated that the remote communication unit 104, connected to the server 110, preferably includes identical components as the communication unit at the user station so it can also be connected to a television set to display menu-driven windows, if desired.

Figure 3:
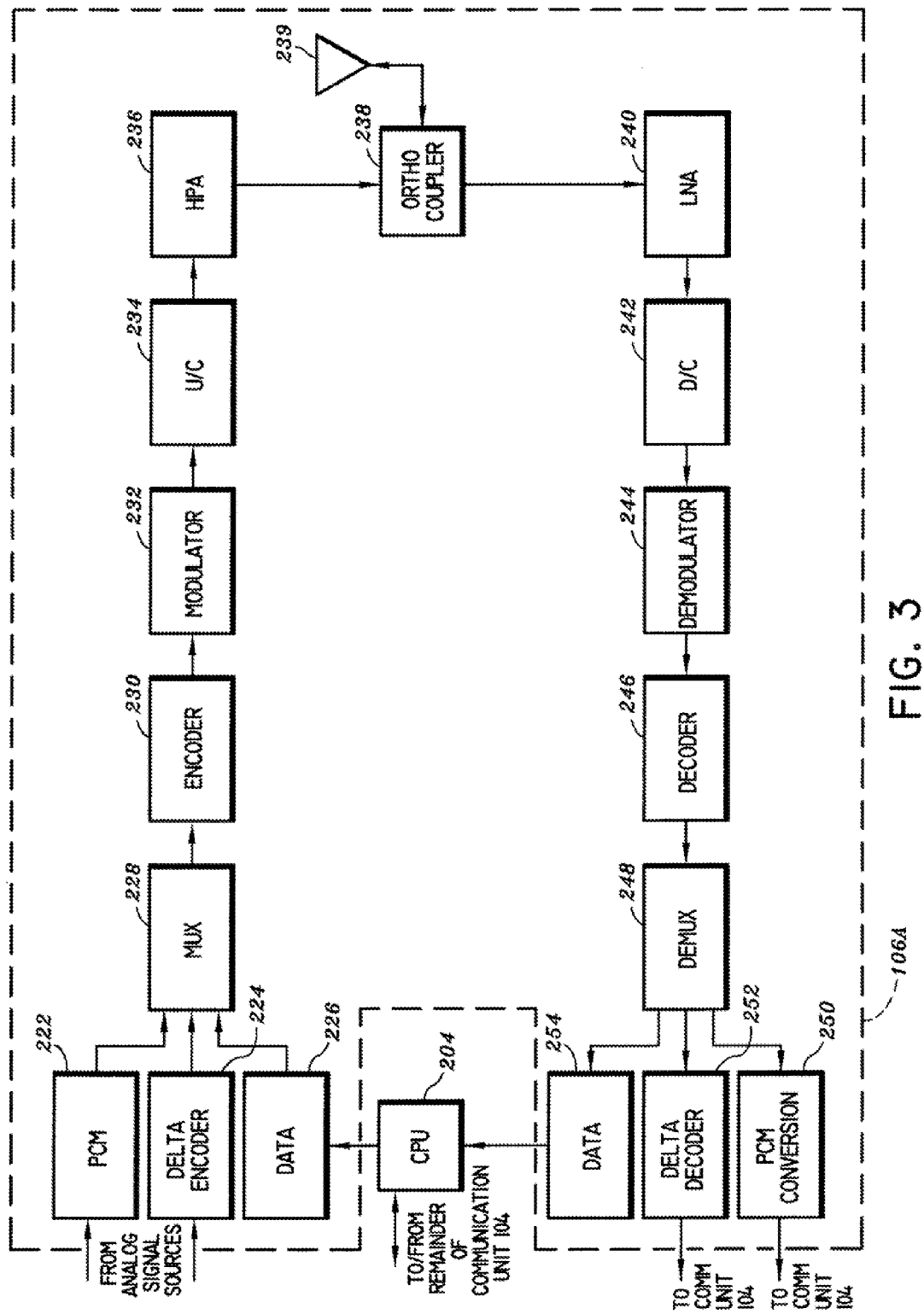
FIG. 3 is a block diagram of a satellite transceiver according to one embodiment of the present invention.

Referring now to FIG. 3, an embodiment of a satellite transceiver 106A according to the invention is shown. The satellite transceiver 106A includes a signal transmission portion and a signal reception portion. The signal transmission portion includes a PCM converter 222 and a delta encoder 224 operatively coupled to a multiplexer (MUX) 228. The MUX 228 is operatively coupled to an encoder 230, which is operatively coupled to a modulator 232. The modulator 232 is operatively coupled to an up-converter (U/C) 234, which is operatively coupled to a high power amplifier (HPA) 236. The HPA 236 is operatively coupled to an ortho coupler 238, which is operatively coupled to an antenna 239.

The signal reception portion also includes the antenna 239 operatively coupled to a low noise amplifier (LNA) 240. The LNA 240 is operatively coupled to a down-converter (D/C) 242, which is operatively coupled to a demodulator 244. The demodulator 244 is operatively coupled to a decoder 246, which is operatively coupled to a demultiplexer (DEMUX) 248. The DEMUX 248 is operatively coupled to a PCM conversion unit 250 and a delta decoder 252. The antenna 239 is in communication with one or more satellites 106B in the satellite network 106.

Further, the transmission portion of the transceiver 106A is operatively coupled to the communication unit 104 via the CPU 204 of the communication unit and, as such, the CPU 204 provides data 226 to the transmission portion for transmission to a remote station (e.g., server 110). Likewise, the CPU 204 is operatively coupled to the reception portion of the transceiver 106A and, as such, receives data 254 from the reception portion for processing and display on the television set 102.

The operation of the transmission portion of the satellite transceiver 106A will now be described. Data 226 is provided from the CPU 204 of the communication unit 104 to the transceiver 106A. This data is in digital form and represents the information (e.g., request or message) which the user wishes to be sent to the server 110. In addition, other external analog data signals may be passed through a baseband processor (not shown) which can digitize the signals, if necessary, and which can combine the signal with any other inputs to form a digital stream. Alternatively, analog-to-digital conversion of such other external signals may be accomplished via a pulse code modulation (PCM) unit 222 or a delta encoder 224.

If data is also provided by the PCM unit 222 and/or the delta encoder 224, the MUX 228 multiplexes (i.e., selects) the signals from the PCM unit 222, and/or the delta encoder 224, and the data 226 from the CPU 204. If only data 226 is present, then the data 226 is passed through the MUX 228. Nonetheless, the output of the MUX 228 is encoded by the encoder 230. The encoded digital signal is then modulated by the modulator 232. The modulator 232 transforms the signal to a suitable format for transmission. The modulator output is normally centered around 70-140 MHZ. In a digital modulator, input bits are used to modulate amplitude, frequency or phase of the carrier, either individually or in combination. This determines the power and bandwidth efficiency of the modulation technique. The modulator output is then translated to a radio frequency (RF) output by up-converter (U/C) 234 via linear translation. The output is amplified by high power amplifier (HPA) 236 depending on the power requirement in the uplink. Generally, these uplink frequencies are in the range of about 6-12 GHz. The antenna 239 is connected to the HPA 236 via ortho coupler 238. The ortho coupler 238 allows the simultaneous use of the antenna for transmission and reception of signals. The signal is then transmitted by the antenna 239 to satellite 106B.

The operation of the reception portion of the satellite transceiver 106A will now be described. The low noise amplifier (LNA) 240 receives a wideband signal from the satellite via the antenna 239 and the ortho coupler 238. The LNA 240 amplifies the wideband signal received from the satellite. The low noise amplified signal is then down converted by frequency down converter (D/C) 242. Corresponding downlinks for commercial communications are about 4 to 12 GHz. The signal is then demodulated by demodulator 244 in a manner preferably complementary to the modulation technique of modulator 232. The signal is then decoded by decoder 246 in a manner preferably complementary to the encoding technique of encoder 230. The DEMUX then demultiplexes the signal, if necessary (i.e., if other signals are present with the information signal returned from the server 110). The other signals may then be provided to the PCM conversion unit 250 and/or to the delta decoder 252, which respectively perform digital-to-analog conversion of respective analog signals received from the DEMUX 248. The analog signals are then preferably provided to the communication unit 104, where the combiner unit 221 combines the signals with the signal output from the DAC 220 and then provides the combined signal to the television set 102. Alternatively, the other signals may be provided directly to the television set 102, while the output of the DAC 220 is separately input to the television set 102, in which case, the combiner 221 would not be necessary. It is to be appreciated that such other signals may be separate television signals received by the satellite network 106 for display on the television set 102.

As mentioned, regardless of whether there are any additional signals received by the transceiver 106A, the information signal is output from the DEMUX 248 as data 254 and provided to the CPU 204 of the communication unit 104. In the communication unit 104, the digital signal is then processed by the CPU 204 and stored in the hard disk 205 or SRAM 206. Once the signal is received the LED indicator 213 on the communication unit illuminates. The CPU 204 then provides the appropriate information to the graphics controller 216 which, in response, generates the appropriate display signals. The user then views the received messages and/or information on the screen of the television set 102 in cooperation with the remote keyboard unit 214 and the application-specific menu-driven functions.

Figure 4A:
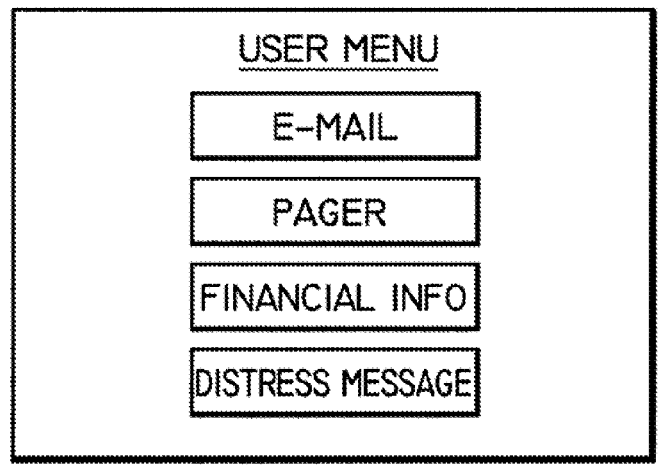
FIGS. 4A through 4D are exemplary views of user-interactive windows generated according to an embodiment of the present invention.
Figure 4B:
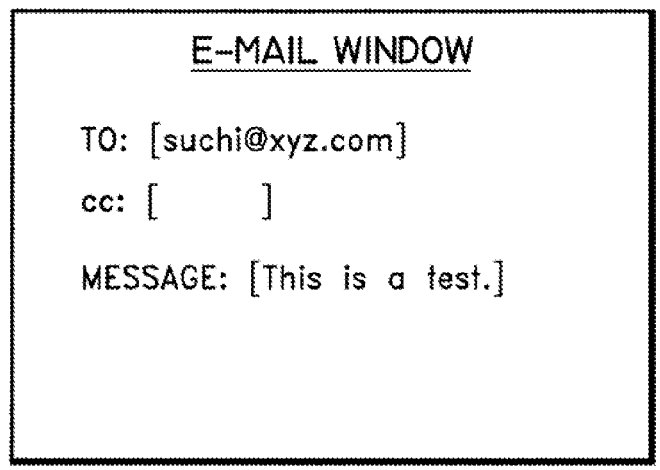

Referring now to FIGS. 4A through 4D, some examples of application-specific menu-driven windows are illustrated. As mentioned, these windows are generated on the television set 102 in response to the display signals generated by the communication unit 104. The user uses the remote keyboard 214 to activate desired windows, enter data, and make selections. When a user is presented with options on the user menu (FIG. 4A), each of the options open up into a sub-menu containing information and selection options specific to the subject matter of that sub-menu. The selections and data entered by the user in accordance with the sub-menu are processed by the CPU 204 which creates the information signal(s) to go to the server 110 for further execution. For example, in the menu window shown in FIG. 4A, when a user clicks on the icon "E-MAIL", the window shown in FIG. 4B is displayed on the television set 102. In this window, the user may enter e-mail related information such as the e-mail address to which the e-mail is to be sent, any additional e-mail addresses to be copied, and the text of the e-mail message. Based on the information that the user fills out, a message string such as: "e-mail suchi at xyz.com. This is a test." is created by the CPU 204 of the communication unit 104 and sent to the server 110 as an information signal. The server 110 executes the e-mail function. That is, the server 110 connects to a mail server facility (e.g., via respective internal modems therein over a telephone line) and forwards the e-mail message in accordance with the mail server to the Internet 12 according to the e-mail address specified in the message string. Of course, return e-mail messages, when received, are displayed in this window.

Figure 4C:
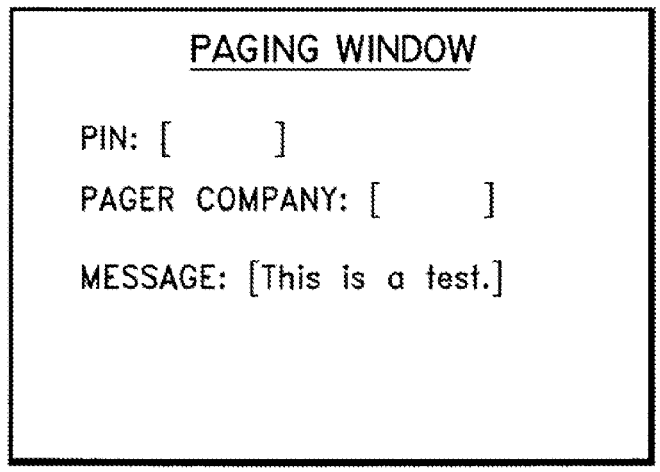

Similarly, if the user clicks on the "PAGER" icon in the user menu (FIG. 4A), then the paging sub-menu, shown in FIG. 4C, is displayed on the television set 102. The user then enters a pager identification number (PIN) of the person to be paged, the paging company or service to be used, and the message. From this information, the CPU 204 generates a string such as: "page 01234567 xyz company Bring home milk." The string is sent to the server 110 which contacts (dials) the paging company server (via respective internal modems over a telephone line) and submits the PIN and message to the paging system. The paging server then sends out a page signal via its own wireless network (e.g., satellite network) to the intended recipient. If the recipient responds from their pager back to the paging system, the paging server dials server 110 and dispatches the return message. The return message is sent back to the user station for display on the television set in this window. Thus, two way messaging is accomplished.

Figure 4D:
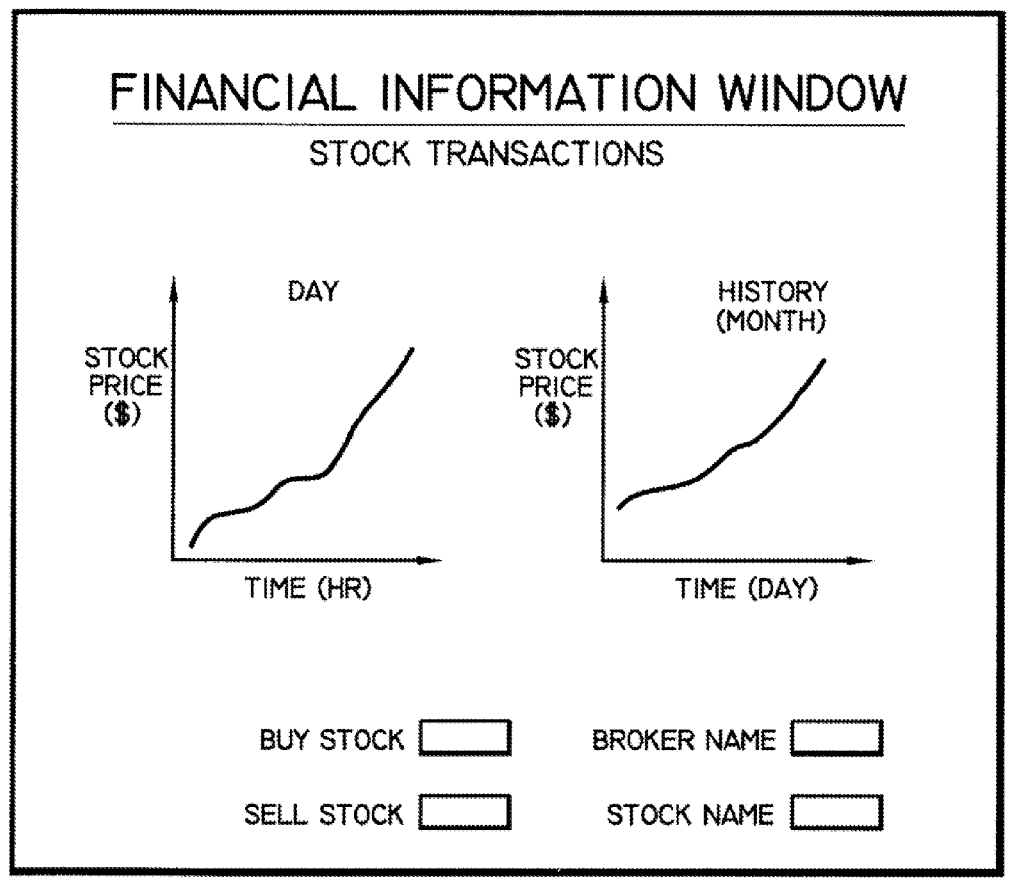

Still further, when the user clicks on the "FINANCIAL INFO" icon in the user menu (FIG. 4A), a financial information window, as shown in FIG. 4D, is displayed on the television set 102. The window shown in FIG. 4D is a stock transaction window. However, similar windows for other financial market transactions may be generated according to the invention (e.g., mutual funds, banking, etc.). The window provides the user with information pertaining to stocks and provides the user with the ability to perform transactions, such as selecting a broker, and buying or selling a particular stock. Similar to the above examples, a message string is generated and sent to server 110 which then connects with the appropriate financial web site to provide two-way communication. Return information may also be displayed to the user in this window.

It is to be appreciated that given the above examples, one of ordinary skill in the art will contemplate examples of distress message windows displayable upon clicking on the "DISTRESS MESSAGE" icon in the user menu of FIG. 4A. Also, in one embodiment of the invention, rather than display any particular window, the CPU 204 generates a predetermined distress message when the user clicks on the "DISTRESS MESSAGE" icon. For example, the message could be a general call to 911 for emergency service. As explained, the request signal is transmitted to the server 110 which dials the 911 service (i.e., emergency response network 118). Also, return messages or inquiries could be sent back to the user station, in which case an appropriate message window would be displayed on the television set allowing the user to read the return message and, if necessary, respond thereto.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A wireless information signal transfer and interactive television system comprises:
   at least a first communication system, operatively coupled to a television set, comprising a first RF transceiver unit and a first data processing unit for generating at least one information signal and for generating at least one display signal for display on the television set;
   a wireless signal transfer network, operatively coupled to the at least a first communication system, for wirelessly transferring signals including the at least one information signal;
   at least a second communication system operatively coupled to the wireless transfer network, comprising a second RF transceiver unit and a second data processing unit for receiving and processing the at least one information signal; and
   a server, operatively coupled to the at least a second communication system, for receiving and processing the at least one information signal and providing data included in the information signal to a functional network, wherein the server retrieves return data from the functional network and provides the return data to the at least a second communication system, the at least a second communication system generating at least one return information signal and providing the at least one return information signal to the wireless signal transfer network, the wireless signal transfer network wirelessly transferring the at least one return information signal to the at least a first communication system, which generates the at least one display signal for display on the television set, wherein the at least one information signal and the at least one return information signal are independently transmitted from a television signal.

2. The system of claim 1, further comprising remote data entry and control means, wirelessly coupled to the first data processing unit, for permitting a system user to control display of display signals on the television set and enter data corresponding to the display of the display signals.

3. The system of claim 2, wherein the remote data entry and control means comprises an alphanumeric keyboard portion.

4. The system of claim 3, wherein the alphanumeric keyboard portion is in infrared communication with the first data processing unit.

5. The system of claim 2, wherein the remote data entry and control means comprises a speaker phone portion.

6. The system of claim 5, wherein the speaker phone portion is in RF communication with the first data processing unit.

7. The system of claim 1, wherein the wireless signal transfer network is a satellite network.

8. The system of claim 7, wherein the satellite network includes at least one satellite for transferring signals between the first and second RF transceiver units.

9. The system of claim 1, wherein the functional network is a wide area information network.

10. The system of claim 9, wherein the wide area network includes a mail server.

11. The system of claim 1, wherein the functional network is a paging network.

12. The system of claim 11, wherein the paging network includes a paging server.

13. The system of claim 11, wherein the paging network includes a plurality of pagers.

14. The system of claim 1, wherein the functional network is an emergency response network.

15. The system of claim 14, wherein the emergency response network includes a server.

16. The system of claim 1, wherein the first data processing unit comprises indication means for indicating that the at least one return information signal has been received.

17. The system of claim 16, wherein the indicating means is an LED.

18. The system of claim 1, wherein the at least one display signal generated by the first data processing unit includes data to generate at least one menu-driven window on the television set.

19. The system of claim 18, wherein the at least one menu-driven window includes displayable information relating to e-mail messages.

20. The system of claim 19, wherein the first data processing unit generates a message string to be included as part of the at least one information signal containing information entered by the user in the e-mail window.

21. The system of claim 20, wherein the functional network is a wide area network haying a mail server and further wherein the server coupled to the at least a second communication system provides the message string to the mail server.

22. The system of claim 18, wherein the at least one menu-driven window includes displayable information relating to paging messages.

23. The system of claim 22, wherein the at least a first communication system generates a message string to be included as part of the at least one information signal containing information entered by the user in the paging window.

24. The system of claim 23, wherein the functional network is a paging network having a paging server and further wherein the server coupled to the at least a second communication system provides the message string to the paging server.

25. The system of claim 18, wherein the at least one menu-driven window includes displayable information relating to financial market transactions.

26. The system of claim 25, wherein the first data processing unit generates a message string to be included as part of the at least one information signal containing information entered by the user in the financial transaction window.

27. The system of claim 26, wherein the functional network is a wide area network and further wherein the server coupled to the at least a second communication system provides the message string to the wide area network.

28. The system of claim 18, wherein the at least one menu-driven window includes displayable information relating to emergency messages.

29. The system of claim 28, wherein the first data processing unit generates a message string to be included as part of the at least one information signal containing information entered by the user in the emergency message window.

30. The system of claim 29, wherein the functional network is an emergency response network having a emergency response server and further wherein the server coupled to the at least a second communication system provides the message string to the emergency response server.

31. The system of claim 1, wherein the first data processing unit comprises:
    processing means;
    input controlling means, operatively coupled to the processing means and the remote data entry and control means, for receiving data and control information from the remote data and control means and providing said information to the processing means; and
    display signal generating means, operatively coupled to the processing means, for generating the at least one display signal for display on the television set, in response to the at least one return information signal received by the processing means and the data and control information from the remote data and control means.

32. The system of claim 31, wherein the at least one display signal generated by the display signal generating means is a digital signal and wherein the first data processing unit further comprises digital-to-analog conversion means, operatively coupled to the display signal generating means, for converting the digital display signal to analog form for display on the television set.

33. The system of claim 32, wherein the first data processing unit further comprises a signal combiner, operatively coupled between the digital-to-analog conversion means and the television set, for combining the analog display signal with at least another analog signal received from the wireless signal transfer network and providing the combined signals to the television set.

34. A wireless information signal transfer and interactive television system comprises:
    a first communication system, operatively coupled to a television set, comprising a first RF transceiver unit and a first data processing unit for generating at least one information signal and for generating and displaying at least one display signal superimposed on a conventional television signal on the television set;
    a remote keyboard device, wirelessly coupled to the first data processing unit, for permitting a system user to control display of the at least one display signal on the television set and enter data corresponding to the display of the at least one display signal;
    a satellite network, operatively coupled to the first RF transceiver unit, for wirelessly transferring signals including the at least one information signal;
    a second communication system, operatively coupled to the satellite network, comprising a second RF transceiver unit and a second data processing unit for receiving and processing the at least one information signal; and
    a server, operatively coupled to the second communication system, for processing the at leas one information signal and providing data included in the information signal to a network;
    wherein the server retrieves return data from the network and provides the return data to the second communication system, the second communication system generating at least one return information signal and providing the at least one return information signal to the satellite network, the satellite network wirelessly transferring the at least one return information signal to the first communication system, which generates and displays the at least one display signal superimposed on a conventional television signal on the television set, wherein the at least one information signal and the at least one return information signal are independently transmitted from a television signal.

35. The system of claim 34, wherein the satellite network includes at least one satellite for transferring signals between the first and second RF transceiver units.

36. The system of claim 34, wherein the network coupled to the serve is a wide area information network.

37. The system of claim 36, wherein the wide area information network is the Internet.

38. The system of claim 34, wherein the network coupled to the server is a paging network.

39. The system of claim 34, wherein the network is an emergency response network.

40. The system of claim 34, wherein the first data processing unit comprises indication means for indicating that the at least one return information signal has been received.

41. The system of claim 40, wherein the indication means is an LED.

42. The system of claim 34, wherein the at least one display signal generated by the first data processing unit includes data to generate at least one menu driven window on the television set.

* * * * *